United States Patent Office 2,891,868
Patented June 23, 1959

2,891,868

CHEWING GUM AND CONFECTIONERY COMPOSITION

Robert Heggie, Garden City, N.Y., Raymond M. Hainer, Lexington, Mass., and Miroslaw Sahaydak, Rosedale, N.Y., assignors to American Chicle Company, a corporation of New Jersey No Drawing. Application November 21, 1957
Serial No. 697,785

3 Claims. (Cl. 99—135)

This invention relates to flavored products such as compressed flavored confectionery tablets and chewing gum. In particular it is directed to the preservation of the flavors thereof.

Products of the class mentioned undergo deterioration in flavor, due to the oxidation of the organic flavoring components. For example, peppermint flavoring in such products, provided by incorporating peppermint oil therein, is especially susceptible to deterioration.

The characteristic of the invention is our discovery that enzyme deoxygenators, such as glucose oxidase, with glucose substrate and catalase, will be effective in intimate direct contact with the constituents of dry confectionery tablets, and dry chewing gum tablets (usually in stick form) and wherein only bound water or water of crystallization is present in the flavored confectionery tablet or gum, and this is in low degree. The chewing gum constituents may be considered fundamentally those of the confectionery tablet, plus a masticatory base material.

This discovery is contrary to the prior art which teaches that free water always must be present for the enzymatic reaction.

In 1928 Muller (Biochemical Zeitung, 199, p. 136) disclosed that *Aspergillus niger* and *Penicillium glaucum* constituted glucose oxidizers and in the following year he termed the enzyme, in each case, "glucoxidase," i.e., glucose oxidase (Biochem. Zeit., 205 p. 111). In 1936 Muller confirmed the findings of others as to the reaction, and taught that one of the oxygen atoms combined with glucose to form gluconic acid and the other combined with free water to form hydrogen peroxide (D. Ergebn Enzymforsh 5, p. 259). Hydrogen peroxide being an active oxidizer, early interest was shown in enzymes which quickly decompose the peroxide, and the term "catalase" was given for such enzymes. Prior to 1929 the subject was well taught (Charmandarian, Biochem. Zeit., 207, 462–71).

In 1944 Baker filed a patent application which matured into Patent No. 2,482,724, now Reissue 23,523. He simply used the *Aspergillus niger*, or *Penicillium glaucum* of Muller as oxidase, along with an old catalase, for deoxidation of foods in free water i.e. aqueous liquids, the oxidase and catalase being directly placed in such water phase of the foods.

In 1953 Scott filed a patent application for deoxidation of dry foods which matured into Patent 2,758,932. He stated that the Baker procedure was not operative with foods essentially free from water "since an aqueous substrate is required for the enzymatic reaction to occur." What Scott did was to place a waterproof, but oxygen-gas permeable, envelope, in the sealed container of dry food, the envelope holding the enzyme system and glucose in "a dispersion of water," with theoretical passage of the oxygen into the envelope. Such an arrangement obviously would deoxidize little of the oxygen surrounding the food particles.

We have discovered that oxidase-catalase enzymes in direct intimate admixture with the constituents of confectionery tablets, including those embodying masticatory gum, in the absence of free water, there being present only bound water or water of crystallization, will result in protection of the flavor constituents against oxidization for satisfactory extended periods of time.

As an example: Compressed confectionery tablet

| | |
|---|---|
| Sugar | 22.620 grains. |
| Glucose | .441 grain. |
| Magnesium stearate | .023 grain. |
| Peppermint oil | .041 grain. |
| Dee O enzymes [1] | .015 grain. |

23.14 grains per tablet.

[1] A dry powder enzyme formulation containing glucose oxidase, catalase and inert matter (Takamine Laboratory, Clifton, N.J.).

As a further example:
A formula for chewing gum, tablets, i.e., sticks:

| | |
|---|---|
| Base (containing up to 40% calcium carbonate) | 0.5738 gram. |
| Sugar | 1.8362 grams. |
| Glucose | 0.4591 gram. |
| Dee O enzymes | 0.0019 gram. |
| Flavor | 0.0290 gram. |

2.9 grams per slab or stick.

In the said examples, free water was absent and only very low bound water, or water of crystallization was present, and this mainly in the glucose itself.

It will be apparent that the amount of deoxygenating enzymes incorporated in the mixture of ingredients entering into the composition is such as to consume the oxygen that is entrapped, absorbed, adsorbed, or otherwise taken up by the product during the time elapsing during the manufacture thereof preparatory to being packaged ready for marketing, and particularly in the mixing of the constituents, and to take care of the entrance of minor amounts of air into machine produced packages, and to provide extended shelf life. On a weight basis, the percentages of the enzyme preparation above set forth in the example are illustrative of adequate amounts to be in excess of that required to eliminate the uncombined oxygen in the tablet (gum-containing or otherwise), the excess providing for oxygen brought into contact from outside. A greater amount of enzymes merely adds to the cost of production.

The enzyme activity is reduced with the accumulation of the gluconic acid and its attendant fall in pH. By adding a buffering agent, such as alumina or other inorganic solid buffering material, the pH can be maintained in a satisfactory range for continued enzyme activity. While enzyme activity is not as rapid in an essentially dry state, where molecular diffusion is much slower, this activity does still persist in a satisfactory amount to remove gaseous oxygen specifically from packaged confectionery tablets and chewing gum in a time interval satisfactory for the preservation of the oxidation-sensitive flavoring ingredients.

Preliminary to our discovery as above recited, it was thought by us, in view of the prior teachings, that a confectionery tablet or stick of chewing gum containing the enzyme system for deoxidizing, would require free water, and many months of tests were spent by us in the problem of how to provide free water in the products. Thus, in one attempt to solve the problem, an envelope was placed in the wrapped package containing 0.2 gram glucose, 0.1 gram alumina (high surface activity), 0.005 gram of the enzyme system, and 0.5 gram of water. By such endeavors and after finally discarding the same as unsatisfactory, the present invention was created, and found unexpectedly to be operative.

An important step in the development of the application of the enzyme system to packaged gum, was our step of incorporating the enzyme into the gum formulation as one incorporates a flavor ingredient during manufacture. Previous experience and knowledge concerning enzymes predicts that this incorporation would fail for the following reasons:

(1) Enzymes, being labile biologically produced protein materials, are easily denaturized and destroyed by heating processes; the mixing of gum base and associated materials is under heat which exceeds 50–55° C. (2) The use of enzyme in a system exposed to air under partially elevated temperatures where diffusion of oxygen is rapid, and under conditions of large surface exposure where the availability of oxygen is maximized, as in mixing, should lead to the exhaustion of the enzyme prior to the wrapping and packaging of chewing gum. (3) Furthermore, the isolation of the enzyme and substrate within a solidified gum, and the absence of free water in the gum product, should decrease the activity of the enzyme to the point where its function could no longer be carried out. In the face of these overwhelming obstacles, we found quite unexpectedly, in spite of the prior art teachings, that the enzymes protected the flavoring materials from oxidation during manufacture and conditioning, that deterioration was delayed, and that the use of enzymes markedly improved the flavor of for example, peppermint gum both at the finish of manufacture and many weeks later. In fact, the use of enzyme, in this dry system effectuates the enzyme in a manner which is unexpected from any previous teachings, and allows the product to be fully operative even after wrapping the chewing gum several days subsequent to its manufacture.

The tablets (omitting gum), wrapped as customary will exhibit no change in flavor at the end of six months. In contrast thereto, wrapped tablets of the same composition, except that the enzymes were absent, exhibited flavor deterioration in four months.

The sticks of chewing gum were wrapped in sealed packages, and exhibited no chanage in flavor at the end of four months and no material change in flavor up to six months. In contrast thereto, tablets i.e. sticks of chewing gum of the same compostion, except for the omission of the enzymes, exhibited marked flavor deterioration within three months.

Having described our invention what we claim and desire to secure by Letters Patent is as follows:

1. A dry confectionery tablet made from a mixture prepared essentially without free water and incorporating sugar, glucose, a buffer, flavoring material subject to oxidative deterioration, and glucose oxidase and catalase intimately mixed with said tablet constituents and in proportion substantially in excess of that required to eliminate the uncombined oxygen in said tablet.

2. A confectionery tablet made from a mixture prepared essentially without free water, and incorporating a masticatory gum base, sugar, glucose, a buffer, flavoring material subject to oxidative deterioration, and glucose oxidase and catalase intimately mixed with said tablet constituents and in proportion substantially in excess of that required to eliminate the uncombined oxygen in said tablet.

3. A method of manufacturing a confectionery dry tablet containing a masticatory gum, sugar, glucose, flavoring material and a buffer, for the protection of the flavoring material therein against oxidative deterioration, which comprises mixing said constituents essentially in the absence of free water, under applied heat, and with intimate admixture therewith of glucose-oxidase and catalase, followed, by the steps of cooling and forming the product, the glucose-oxidase and catalase being in proportion substantially in excess of that required to eliminate the uncombined oxygen in said tablet.

References Cited in the file of this patent
UNITED STATES PATENTS

| | | |
|---|---|---|
| 1,771,981 | Mustin | July 29, 1930 |
| 2,744,017 | Baldwin | May 1, 1956 |